United States Patent
Wu (10) Patent No.: US 10,061,163 B2
(45) Date of Patent: Aug. 28, 2018

(54) COLOR FILTER PLATE AND FABRICATION METHOD THEREOF, DISPLAY PANEL

(71) Applicants: Xiamen Tianma Micro-electronics Co., Ltd., Xiamen (CN); Tianma Micro-electronics Co., Ltd., Shenzhen (CN)

(72) Inventor: Xiaoxiao Wu, Xiamen (CN)

(73) Assignees: Xiamen Tianma Micro-electronics Co., Ltd., Xiamen (CN); Tianma Micro-electronics Co., Ltd., Shenzhen (CN)

(*) Notice: Subject to any disclaimer, the term of this patent is extended or adjusted under 35 U.S.C. 154(b) by 151 days.

(21) Appl. No.: 15/094,073

(22) Filed: Apr. 8, 2016

(65) Prior Publication Data

US 2017/0176801 A1 Jun. 22, 2017

(30) Foreign Application Priority Data

Dec. 18, 2015 (CN) .......................... 2015 1 0960724

(51) Int. Cl.
*G02B 5/22* (2006.01)
*G02F 1/1339* (2006.01)
(Continued)

(52) U.S. Cl.
CPC ......... *G02F 1/13394* (2013.01); *G02B 5/201* (2013.01); *G02B 5/22* (2013.01);
(Continued)

(58) Field of Classification Search
CPC ..... G02B 5/201; G02B 5/22; G02F 1/133509; G02F 1/133512; G02F 1/133514;
(Continued)

(56) References Cited

U.S. PATENT DOCUMENTS

2006/0205312 A1* 9/2006 Takenaka ................ H01J 9/185
445/24
2009/0072337 A1* 3/2009 Lee .................... H01L 27/14609
257/440
(Continued)

FOREIGN PATENT DOCUMENTS

| CN | 202330955 U | 7/2012 |
| CN | 103454812 A | 12/2013 |
| CN | 104730779 A | 6/2015 |

OTHER PUBLICATIONS

Machine translation of Jinbo Lu, CN 202330955 U.*

*Primary Examiner* — Bumsuk Won
*Assistant Examiner* — Balram Parbadia
(74) *Attorney, Agent, or Firm* — Anova Law Group, PLLC (57) ABSTRACT

A color filter plate, a display device including the color filter plate, and a color filter plate fabrication method are provided. The color filter plate comprises a substrate, a black matrix formed on the substrate, a color barrier layer formed on the black matrix, a protective layer formed on the black matrix and the color barrier layer, and a plurality of photo spacers formed on the protective layer. At least one hole is formed in the protective layer and between any two adjacent photo spacers, such that lower parts of adjacent photo spacers are no longer in contact with each other, and the adjacent photo spacers are fully separated from each other.

19 Claims, 5 Drawing Sheets

(51) Int. Cl.
    *G02B 5/20*     (2006.01)
    *G02F 1/1335*   (2006.01)
    *G02F 1/1368*   (2006.01)
(52) U.S. Cl.
    CPC .. *G02F 1/133512* (2013.01); *G02F 1/133514* (2013.01); *G02F 1/133516* (2013.01); *G02F 1/1368* (2013.01)
(58) Field of Classification Search
    CPC .......... G02F 1/133516; G02F 1/13394; G02F 1/1362; G02F 2001/133521; G02F 2001/136222; G02F 2201/52
    See application file for complete search history.

(56) References Cited

U.S. PATENT DOCUMENTS

2010/0238388 A1* 9/2010 Hayashi ................. G02B 5/223
                                                    349/106
2013/0242237 A1* 9/2013 Nagato ............. G02F 1/133509
                                                    349/105

* cited by examiner

COLOR FILTER PLATE AND FABRICATION METHOD THEREOF, DISPLAY PANEL

CROSS-REFERENCES TO RELATED APPLICATIONS

This application claims priority of Chinese Patent Application No. 201510960724.5, filed on Dec. 18, 2015, the entire contents of which are hereby incorporated by reference.

FIELD OF THE INVENTION

The present disclosure generally relates to the field of display technology and, more particularly, relates to a color filter plate and fabrication techniques thereof, and a display panel including the color filter plate.

BACKGROUND

Thin-Film Transistor Liquid Crystal Display (TFT-LCD) is a variant of a liquid crystal display (LCD) that uses thin-film transistor (TFT) technology to improve image qualities such as addressability and contrast. Currently, a TFT-LCD is often formed by a color filter plate and an array substrate arranged opposite to the color filter plate, and the color filter plate enables color display on the TFT-LCD. With the continuous development of LCD technology, PPI (Pixel per Inch) of the TFT-LCD becomes higher and higher and, meanwhile, the pixel size becomes smaller and smaller. To maintain a uniform surface pressure in the TFT-LCD under a vertical pressure, it is highly desired that each sub-pixel corresponds to one photo spacer (PS).

Figure 1:
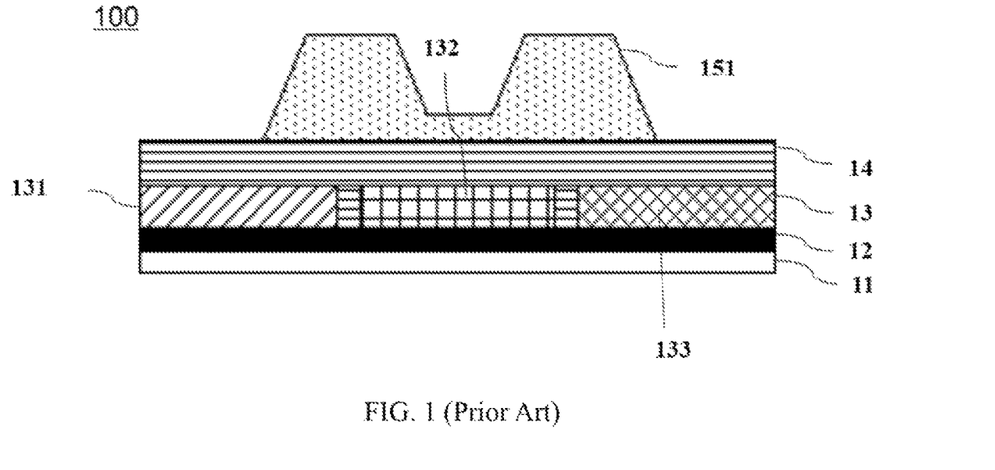
FIG. 1 illustrates a cross-sectional view of a conventional color filter plate.

FIG. 1 illustrates a cross-sectional view of a conventional color filter plate. As shown in FIG. 1, the color filter plate 100 includes a substrate 11, a black matrix 12 formed on the substrate 11, a color barrier layer 13 formed on the black matrix 12, a protective layer 14 formed on the black matrix 12 and the color barrier layer 13, and a plurality of photo spacers 151. In particular, the color barrier layer 13 further includes a plurality of red color barriers 131, a plurality of green color barriers 132 and a plurality of blue color barriers 133. The photo spacers 151 are formed through etching an entire photo spacer material layer, in which etchers, for example, etching solution, may etch the photo spacer material layer from top to bottom, and then to sidewalls.

Because the pixel size of the TFT-LCD with a high PPI is substantially small, the gap or the distance between adjacent photo spacers 151 is small, and the photo spacer material within the gap may not be fully exposed to the etching solution. Thus, the etching speed in the gap between adjacent photo spacers 151 is slower than the other areas in the photo spacer material layer, and the lower parts of adjacent photo spacers 151 may be in contact with each other. During the subsequent fabrication process of the TFT-LCD, e.g., forming a TFT-LCD cell, the diffusivity of liquid crystal molecules may be degraded, resulting cell bubbles in the TFT-LCD cell. Further, with such photo spacers 151, light leakage tends to occur in an alignment rubbing process.

The disclosed color filter plate and the fabrication techniques thereof, and the corresponding display panel are directed to solve one or more problems set forth above and other problems.

BRIEF SUMMARY OF THE DISCLOSURE

One aspect of the present disclosure provides a color filter plate. The color filter plate comprises a substrate, a black matrix formed on the substrate, a color barrier layer formed on the black matrix, a protective layer formed on the black matrix and the color barrier layer, and a plurality of photo spacers formed on the protective layer. At least one hole is formed in the protective layer and between any two adjacent photo spacers, such that lower parts of adjacent photo spacers are no longer in contact with each other, and the adjacent photo spacers are fully separated from each other.

Another aspect of the present disclosure provides a display device comprising a color filter thereof and an array substrate an array substrate arranged opposite to the color filter plate.

Another aspect of the present disclosure provides a color filter plate fabrication method. The method comprises providing a substrate, forming a black matrix layer on the substrate, and pattering the black matrix layer to obtain a black matrix, forming a color barrier layer on the black matrix and patterning the color barrier layer to obtain a plurality of color barriers, forming a protective layer on the black matrix and the color barrier layer, and forming at least one hole in the protective layer, and forming a plurality of photo spacers on the protective layer. The at least one hole is formed in the protective layer and between any two adjacent photo spacers, such that lower parts of adjacent photo spacers are no longer in contact with each other, and the adjacent photo spacers are fully separated from each other.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, the directions described by the words "left", "right", "up" and "down" in the present disclosure are only consistent with the left, right, up and down direction shown in the accompanying drawings, respectively, which are not intended to limit the scope of the present disclosure.

Figure 2:
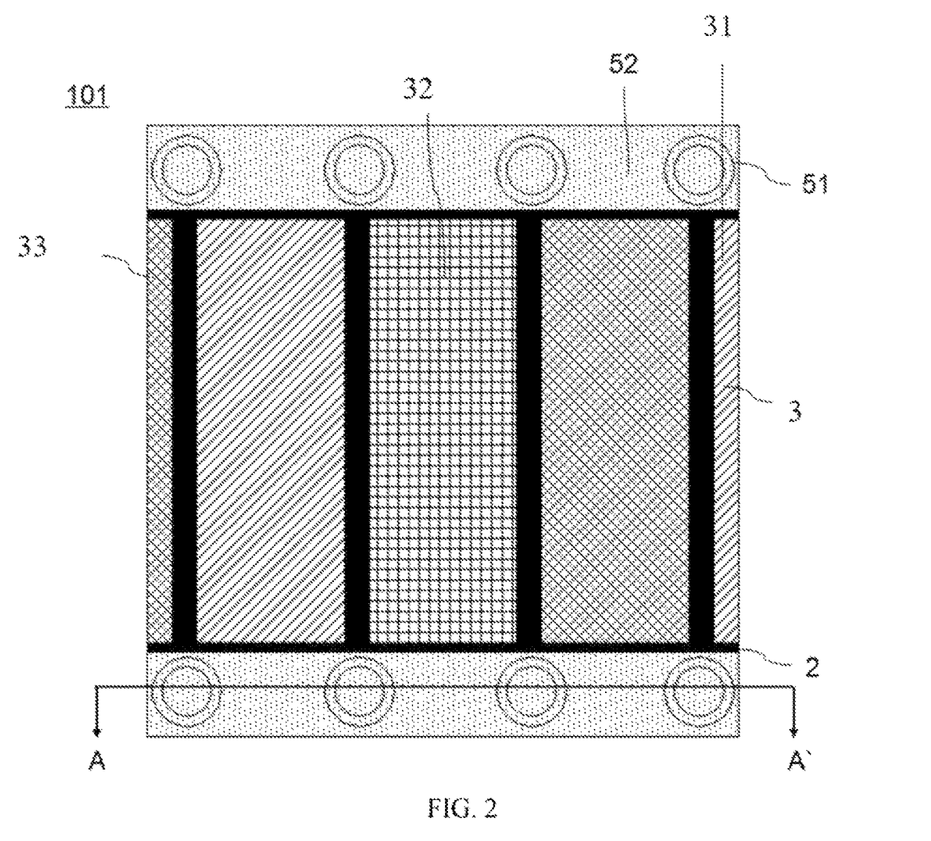
FIG. 2 illustrates a top view of an exemplary color filter plate consistent with disclosed embodiments.
Figure 3:
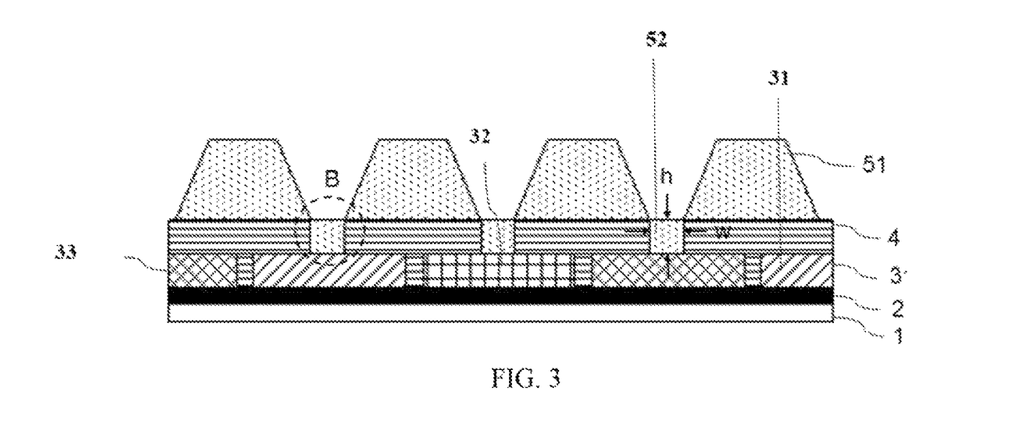
FIG. 3 illustrates an A-A' sectional view of an exemplary color filter plate in FIG. 2 consistent with disclosed embodiments.

The present disclosure provides an improved color filter plate. FIG. 2 illustrates a top view of an exemplary color filter plate consistent with disclosed embodiments. FIG. 3 illustrates an A-A' sectional view of an exemplary color filter plate in FIG. 2 consistent with disclosed embodiments. As shown in FIG. 2 and FIG. 3, the color filter plate 101 may include a substrate 1, a black matrix 2, a color barrier layer 3, a protective layer 4 and a plurality of photo spacers 51. Other components may also be included.

The substrate 1 may be made of transparent materials, such as glass, flexible transparent plastics (e.g., polyimide), etc. For the flexible transparent plastics, given a high-temperature deposition process on the substrate 1, polyimide with excellent heat resistance may be selected as the material for the substrate 1.

The black matrix 2 may be formed on the substrate 1, through depositing a black matrix layer on the substrate 1, and then exposing and developing the black matrix layer in a photolithographic process. The obtained black matrix 2 may include a plurality of black matrix stripes, and the black matrix stripes arranged horizontally may intersect the black matrix stripes arranged vertically.

The color barrier layer 3 may be formed on the black matrix 2. The color barrier layer 3 may further include a plurality of color barriers of different colors, for example, a plurality of red color barriers 31, a plurality of green color barriers 32, and a plurality of blue color barriers 33. In another embodiment, the color barrier layer 3 may also include a plurality of white color barriers and/or color barriers having other colors.

The plurality of red color barriers 31, the plurality of green color barriers 32, and the plurality of blue color barriers 33 may be one-to-one corresponding to a plurality of sub-pixels to form a plurality of red color sub-pixels, a plurality of green color sub-pixels, and a plurality of blue color sub-pixels, etc. The sub-pixels may be disposed on an array substrate arranged opposite to the color filter plate 101. The black matrix stripes may be disposed among adjacent color barriers.

The protective layer 4 may be formed on the black matrix 2 and the color barrier layer 3. In the disclosed embodiments, the protective layer 4 may be formed by positive photo resists. In another embodiment, the protective layer 4 may be formed by negative photo resists.

The photo spacers 51 may be formed on the protective layer 4, and configured to have a predetermined arrangement. For example, as shown in FIG. 2, the photo spacers 51 may be disposed at the intersections between the black matrix stripes, forming a photo spacer array. The arrangement of the photo spacers 51 shown in FIG. 2 is only for illustrative purposes, and is not intended to limit the scope of the present disclosure. The arrangement of the photo spacers 51 may be determined according to different fabrication process and different application scenarios.

The photo spacers 51 may not only maintain a constant height level at micro-scales and precision level uniformity of cell gap dimensions for liquid crystals, but also play an important role in providing acceptable elasticity and mechanical properties. To maintain a uniform surface pressure in the TFT-LCD (after the TFT-LCD cell has been formed) under a vertical pressure, each sub-pixel may be configured to correspond to one photo spacer 51.

For example, as shown in FIG. 2, four photo spacers 51 may be disposed at the intersections between the black matrix stripes confining one red color barrier 31, while one photo spacer 51 may be shared by four color barriers adjacent to the photo spacer 51. Similarly, four photo spacers 51 may be disposed at the intersections between the black matrix stripes confining one green color barrier 32 (blue color barrier 33), while one photo spacer 51 may be shared by four color barriers adjacent to the photo spacer 51. That is, each color barrier may correspond to one photo spacer, and corresponding sub-pixel may also correspond to one photo spacer.

Further, at least one hole B may be formed in the protective layer 4. In particular, a hole or opening B may be disposed between any two adjacent photo spacers 51. For example, as shown in FIG. 2 and FIG. 3, the hole B may be disposed between any two photo spacers 51 adjacent in a row direction of the photo spacer array. In another embodiment, the hole B may be disposed between any two photo spacers 51 adjacent in a column direction of the photo spacer array. In another embodiment, the hole B may be disposed between any two photo spacers 51 adjacent in the row direction of the photo spacer array and, meanwhile, disposed between any two photo spacers 51 adjacent in the column direction of the photo spacer array. In certain embodiments, more than one hole B may be disposed between any two photo spacers 51 adjacent in the row direction or the column direction of the photo spacer array.

Along a direction perpendicular to the color filter plate 101, the projections of the photo spacers 51 may fall within the black matrix 2, i.e., the projection of the photo spacer 51 may overlap with the black matrix. Because the holes B are formed between adjacent photo spacers 51, along the direction perpendicular to the color filter plate 101, the projections of the holes B may also fall within the black matrix 2.

It should be noted that, the depth h of the hole B may be smaller than or equal to the thickness of the protective layer 4. In the disclosed embodiments, the depth h of the hole B may be equal to the thickness of the protective layer 4, i.e., a through-hole. In certain embodiments, according to various situations, the depth h of the hole B may be adjusted through controlling the exposure amount and the exposure time of the protective layer 4 in the photolithographic process.

The hole B may have a rectangular opening, a circular opening, an elliptical opening, etc. According to various situations, the hole B with different shaped opening may be fabricated through adopting photomasks with different patterns. In the disclosed embodiments, the hole B may have a circular opening.

The width w of the hole B may be smaller than or equal to a distance between two adjacent photo spacers 51. The distance between two adjacent photo spacers 51 may be determined by various factors, such as sub-pixel size, sub-pixel layout, elasticity and mechanical requirements of the TFT-LCD cell, etc. In one embodiment, the width w of the hole B may be configured to be approximately $3 \ \mu m \leq w \leq 6 \ \mu m$. For example, the width w of the hole B may be approximately 3 μm, 4 μm, 5 μm, or 6 μm.

If the width w of the hole B is larger than the distance between two adjacent photo spacers 51, the formation of the photo spacers 51 on the protective layer 4 may be affected. In addition, contact areas between the photo spacers 51 and the protective layer 4 may shrink, and the anchoring force between the photo spacers 51 and the protective layer 4 may be reduced accordingly. Thus, when the TFT-LCD is subjected to a horizontal pressure, the photo spacers 51 may be displaced from their original positions, resulting a light leakage and an image performance degradation.

In the disclosed color filter plate, through forming the holes B in the protective layer and between two adjacent photo spacers, the lower parts of adjacent photo spacers 51 (i.e., the parts of the photo spacer close to the protective layer 4) may be no longer in contact with each other. Thus, during the subsequent fabrication process of the TFT-LCD, e.g., forming the TFT-LCD cell, the diffusivity of liquid crystal molecules may be less degraded. Accordingly, the cell bubbles in the TFT-LCD cell and light leakage in the subsequent rubbing alignment process may be also prevented. The reason may be explained as follows.

During the fabrication of the photo spacers 51, a layer of photo spacer material may be first coated on the protective layer 4 with the holes B. Due to the fluidity of the photo spacer material, the holes B may be filled with the photo spacer material 52. Further, the photo spacer material above the hole B may exhibit a curved surface, for example, a concave surface. Compared with the other areas of the spacer material layer, the photo spacer material above the hole B may have a larger contact area with the etching solution but a smaller amount to be etched through, such that the etching speed of the photo spacer material above the hole B may be higher, while the etching time of the photo spacer material above the hole B may be less. Thus, given fixed etching time, the photo spacer material above the hole B may be easier to be etched through. Accordingly, the adjacent photo spacers 51 may be easier to be fully separated from each other through the etching process, i.e., the lower parts of adjacent photo spacers 51 may be no longer in contact with each other.

Figure 5:
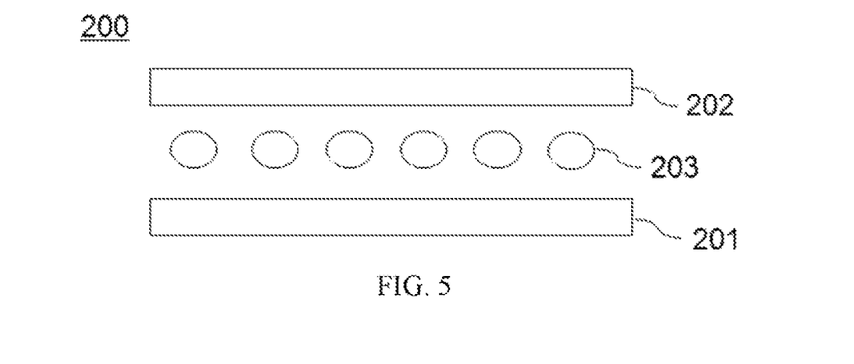
FIG. 5 illustrates a cross-sectional view of an exemplary display panel consistent with disclosed embodiments.

The present disclosure also provides a display panel including the disclosed color filter plate. FIG. 5 illustrates a cross-sectional view of an exemplary display panel consistent with disclosed embodiments. The display panel 200 may be a display panel utilizing a display medium, e.g., liquid crystal (LC) display panel, quantum dots (QD) display panel, or a display panel utilizing self-lighting elements, e.g. organic light-emitting diode (OLED) display panel, light-emitting diode (LED) display panel.

For example, as shown in FIG. 5, the display panel 200 may include an array substrate 201, a color filter plate 202 arranged opposite to the array substrate 201, and a liquid crystal layer 203 sandwiched between the array substrate 201 and the color filter plate 202. The color filter plate 202 may be any one of the disclosed the color filter plates. Although the liquid crystal display panel is shown in FIG. 5, the display panel 200 may be any appropriate type of display panel including any one of the disclosed color filter plates.

The display panel 200 may be a smartphone, a tablet, a TV, a monitor, a notebook, a digital picture frame, a GPS, etc. Further, the display panel 200 may be any product or any component which is capable of displaying images and/or videos. Because the display panel 200 comprises any one of the disclosed color filter plates, the display panel 200 may also have the same advantages as the disclosed color filter plates, which are not repeated here.

Figure 6:
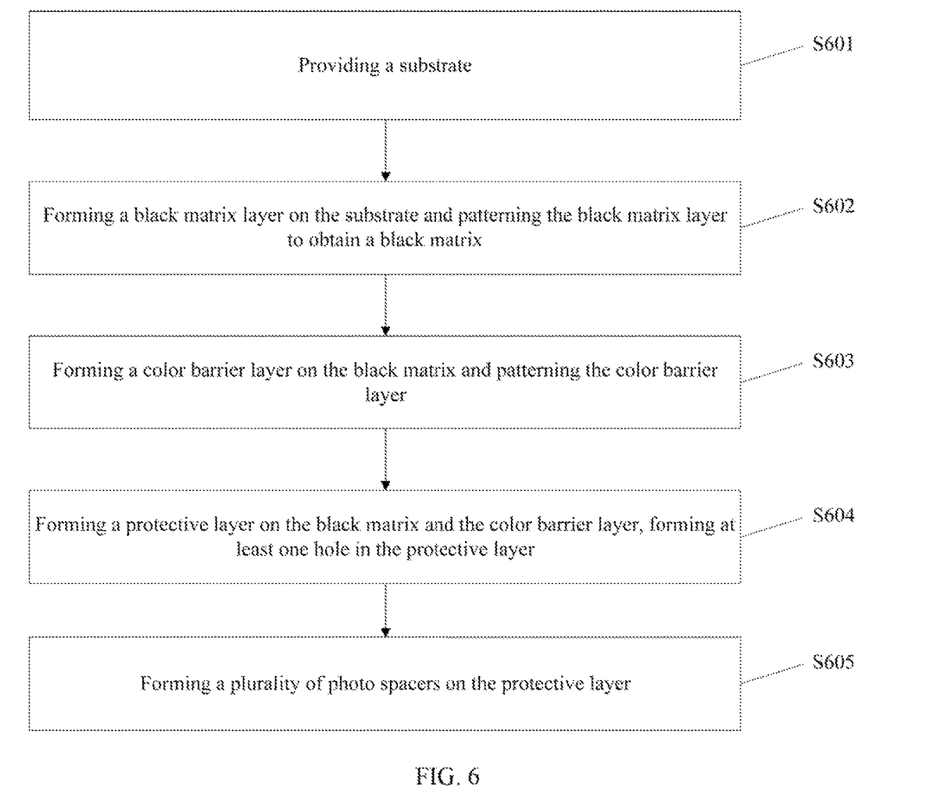
FIG. 6 illustrates a flow chart of an exemplary fabrication process of an exemplary color filter plate consistent with disclosed embodiments.

FIG. 6 illustrates a flow chart of an exemplary fabrication process of an exemplary color filter plate consistent with disclosed embodiments. FIGS. 4a-4d illustrate schematic diagrams of an exemplary fabrication process of an exemplary color filter plate consistent with disclosed embodiments.

Figure 4A:
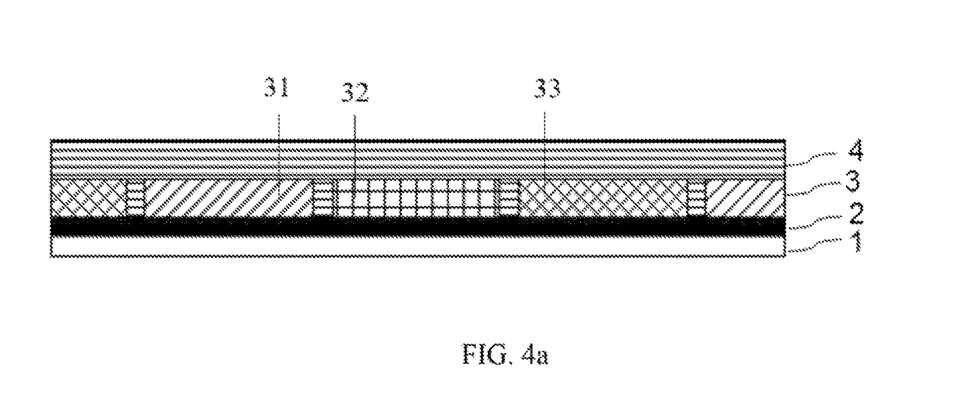
FIGS. 4a-4d illustrate schematic diagrams of an exemplary fabrication process of an exemplary color filter plate consistent with disclosed embodiments.

As shown in FIG. 6, at the beginning of the fabrication process, a substrate is provided (S601). FIG. 4a illustrates a cross-sectional view of a corresponding structure. As shown in FIG. 4a, the substrate 1 may be made of transparent materials, such as glass, flexible transparent plastics (e.g., polyimide), etc. For the flexible transparent plastics, given a high-temperature deposition process on the substrate 1, polyimide with excellent heat resistance may be selected as the material for the substrate 1.

Returning to FIG. 6, a black matrix layer is formed on the substrate, and further patterned to be a back matrix (S602). FIG. 4a illustrates a cross-sectional view of a corresponding structure. As shown in FIG. 4a, the black matrix 2 may be formed on the substrate 1 through the patterning process, which may include photoresist coating, exposure, development, etching and photoresist removing, etc. The obtained black matrix 2 may include a plurality of black matrix stripes, and the black matrix stripes arranged horizontally may intersect the black matrix stripes arranged vertically.

Returning to FIG. 6, a color barrier layer is formed on the black matrix and subjected to a patterning process (S603). FIG. 4a illustrates a cross-sectional view of a corresponding structure. As shown in FIG. 4a, the color barrier layer 3 may be formed on the black matrix 2. The color barrier layer 3 may be patterned to obtain a plurality of color barriers. The patterning process may include photoresist coating, exposure, development, etching and photoresist removing, etc. The plurality of color barriers may be one-to-one corresponding to a plurality of sub-pixels. The black matrix stripes may be disposed among adjacent color barriers.

In one embodiment, the color barrier layer 3 may include a plurality of color barriers of three different colors, for example, a plurality of red color barriers 31, a plurality of green color barriers 32, and a plurality of blue color barriers 33. In particular, in the pattering process of the color barrier layer 3, a first color layer (e.g. a red color layer) may be coated on the black matrix 2, exposed through a first photomask, and developed to form the red color barriers; a second color layer (e.g. a green color layer) may be coated on the black matrix 2, exposed through a second photomask, and developed to form the green color barriers; and a third color layer (e.g. a blue color layer) may be coated on the black matrix 2, exposed through a third photomask and developed to form the green color barriers.

Figure 4B:
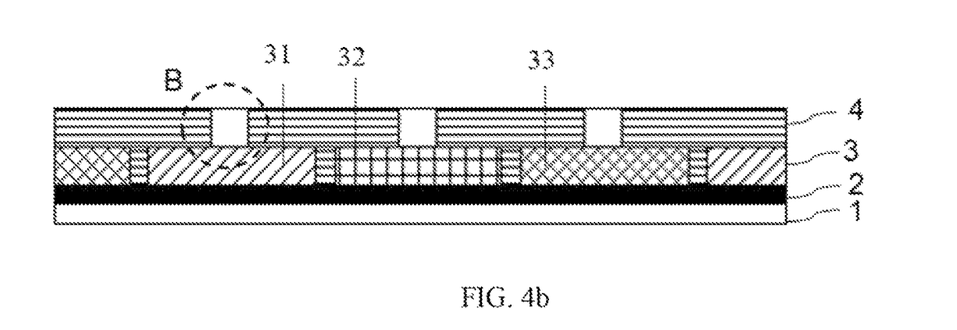

Returning to FIG. 6, a protective layer is formed on the black matrix and the color barrier layer, and at least one hole is formed in the protective layer (S604). FIGS. 4a-4b illustrate cross-sectional views of a corresponding structure. The protective layer 4 may be formed on the color barrier layer 3 and the black matrix 2, and at least one hole B may be formed in the protective layer 4. The hole B may be formed through a patterning process, which may include photoresist coating, exposure, development, etching and photoresist removing, etc.

Figure 4C:
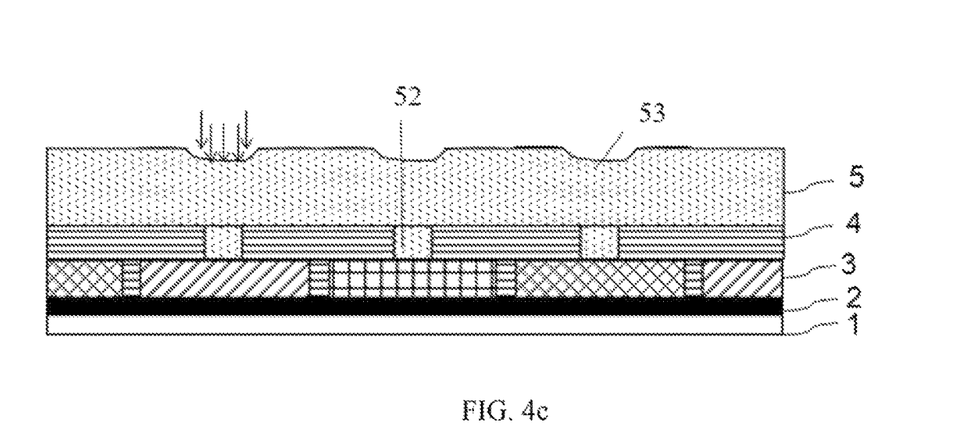
Figure 4D:
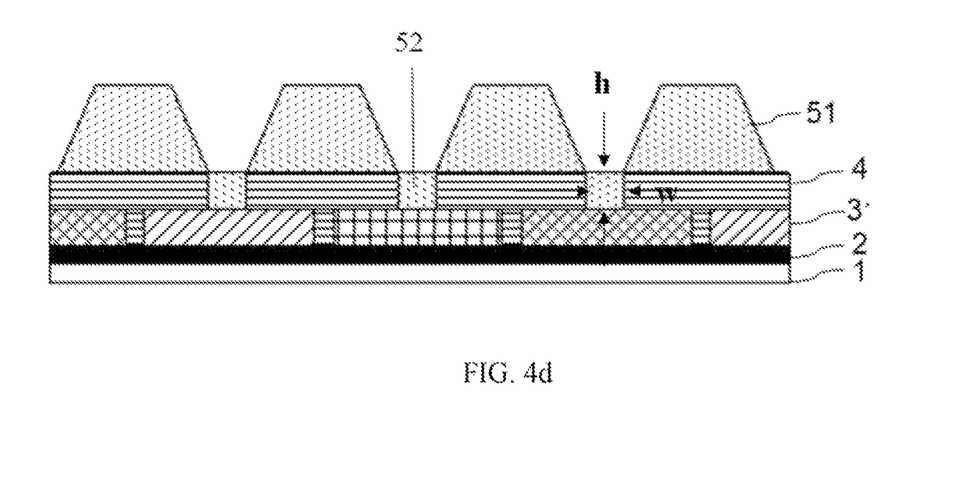

Returning to FIG. 6, after the at least one hole is formed in the protective layer, a plurality of photo spacers are formed on the protective layer (S605). FIGS. 4c-4d illustrate cross-sectional views of a corresponding structure.

In particular, as shown in FIG. 4c, a layer of photo spacer material 5 may be first coated on the protective layer 4. Due to the fluidity of the photo spacer material 5, the holes B may be filled with the photo spacer material 52. Meanwhile, the photo spacer material 53 above the holes B may exhibit a curved surface, for example, a concave surface. Further, as shown in FIG. 4d, the plurality of photo spacers 51 may be formed through etching the layer of the photo spacer material 5.

As shown in FIG. 4d, the photo spacers 51 may be formed on the protective layer 4, and configured to have a predetermined arrangement. For example, the photo spacers 51 may be disposed at the intersections between the black matrix stripes, forming a photo spacer array. The arrangement of the photo spacers 51 may be determined according to different fabrication process and different application scenarios.

The hole B may be formed in the protective layer 4 and between any two adjacent photo spacers 51. In one embodiment, the hole B may be disposed between any two photo spacers 51 adjacent in a row direction of the photo spacer array. In another embodiment, the hole B may be disposed between any two photo spacers 51 adjacent in a column direction of the photo spacer array. In another embodiment, the hole B may be disposed between any two photo spacers 51 adjacent in the row direction of the photo spacer array and, meanwhile, disposed between any two photo spacers 51 adjacent in the column direction of the photo spacer array. In certain embodiments, more than one hole B may be disposed between any two photo spacers 51 adjacent in the row direction or the column direction of the photo spacer array.

Referring to FIGS. 4c-4d, compared with the other areas of the spacer material layer, the photo spacer material 53 above the holes B may have a larger contact area with the etching solution but a smaller amount to be etched through. Thus, the etching speed of the photo spacer material 53 above the holes B may be higher, while the etching time of the photo spacer material 53 above the holes B may be less, Thus, given fixed etching time, the photo spacer material 53 above the holes B may be easier to be etched through, i.e., fully exposed and removed. Accordingly, the adjacent photo spacers 51 may be easier to be fully separated from each other through the etching process, i.e., the lower parts of adjacent photo spacers 51 may be no longer in contact with each other.

The depth h of the hole B may be smaller than or equal to the thickness of the protective layer 4. In the disclosed embodiments, the depth h of the hole B may be equal to the thickness of the protective layer 4. In certain embodiments, according to various situations, the depth h of the hole B may be adjusted through controlling the exposure amount and the exposure time of the protective layer 4.

Further, the hole B may have a rectangular opening, a circular opening, elliptical opening, etc. According to various situations, the hole B with different shaped openings may be fabricated through adopting photomasks with different patterns. In the disclosed embodiments, the hole B may have a circular opening.

The width w of the hole B may be smaller than or equal to a distance between two adjacent photo spacers 51. The distance between two adjacent photo spacers 51 may be determined by various factors, such as sub-pixel size, sub-pixel layout, elasticity and mechanical requirements of the TFT-LCD cell, etc. In one embodiment, the width w of the hole B may be configured to be approximately 3 μm≤w≤6 μm. For example, the width w of the hole B may be approximately 3 μm, 4 μm, 5 μm, or 6 μm.

If the width w of the hole B is larger than the distance between two adjacent photo spacers 51, the formation of the photo spacers 51 on the protective layer 4 may be affected. In addition, contact areas between the photo spacers 51 and the protective layer 4 may shrink, and the anchoring force between the photo spacers 51 and the protective layer 4 may be reduced. Thus, when the TFT-LCD is subjected to a horizontal pressure, the photo spacers 51 may be displaced from their original positions, resulting a light leakage and an image performance degradation.

In the disclosed embodiments, through forming the holes in the protective layer, the lower parts of adjacent photo spacers (i.e., the parts of the photo spacer close to the protective layer) may be no longer in contact with each other. Thus, during the subsequent fabrication process of the TFT-LCD, e.g., forming the TFT-LCD cell, the diffusivity of liquid crystal molecules may be less degraded. Accordingly, the cell bubbles in the TFT-LCD cell and light leakage in the subsequent rubbing alignment process may be also prevented, and the production yield of the TFT-LCD may be improved. Further, a same photomask may be used in the fabrication of the photo spacers on the protective layer and the holes in the protective layer, without increasing the fabrication cost.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:
1. A color filter plate, comprising:
   a substrate;
   a black matrix formed on the substrate;
   a color barrier layer formed on the black matrix;
   a protective layer directly formed on the black matrix and the color barrier layer; and
   a plurality of photo spacers formed on a first surface of the protective layer and maintaining a constant height level, wherein the first surface of the protective layer is facing away from the black matrix and the color barrier layer,
   wherein at least one hole is formed in the protective layer and between any two adjacent photo spacers of the plurality of photo spacers formed on the first surface of the protective layer to separate the any two adjacent photo spacers of the plurality of photo spacers formed on the first surface of the protective layer from being in contact with each other, and
   the at least one hole is filled with a photo spacer material which forms the plurality of photo spacers formed on the first surface of the protective layer rather than a photo spacer of the plurality of photo spacers formed on the first surface of the protective layer.

2. The color filter plate according to claim 1, wherein the color barrier layer further includes:
   a plurality of color barriers corresponding to a plurality of sub-pixels,
   wherein the plurality of sub-pixels correspond to the plurality of photo spacers, and
   along a direction perpendicular to the color filter plate, projections of the photo spacers fall within the black matrix.

3. The color filter plate according to claim 2, wherein the color barrier layer further includes:
   at least a plurality of red color barriers, a plurality of green color barriers and a plurality of blue color barriers corresponding to a plurality of red color sub-pixels, a plurality of green color sub-pixels and a plurality of blue color sub-pixels, respectively.

4. The color filter plate according to claim 2, wherein:
one sub-pixel corresponds to at least one photo spacer.

5. The color filter plate according to claim 2, wherein:
the black matrix further includes a plurality of black matrix stripes confining the color barriers;
the photo spacers are disposed at intersections of the black matrix stripes, forming a photo spacer array; and
the at least one hole is formed in the protective layer and between any two photo spacers adjacent in a row direction of the photo spacer array.

6. The color filter plate according to claim 1, wherein:
a depth of the at least one hole is smaller than or equal to a thickness of the protective layer.

7. The color filter plate according to claim 1, wherein:
the at least one hole has a rectangular opening, a circular opening or an elliptical opening.

8. The color filter plate according to claim 7, wherein:
a width w of the at least one hole is smaller than or equal to a distance between two adjacent photo spacers.

9. The color filter plate according to claim 8, wherein:
in a row direction of the color filter plate, the width w of the at least one hole is approximately 3 µm≤w≤6 µm.

10. A display panel, comprising:
a color filter plate, comprising:
  a substrate,
  a black matrix formed on the substrate,
  a color barrier layer formed on the black matrix,
  a protective layer directly formed on the black matrix and the color barrier layer, and
  a plurality of photo spacers formed on a first surface of the protective layer and maintaining a constant height level, wherein the first surface of the protective layer is facing away from the black matrix and the color barrier layer
  wherein at least one hole is formed in the protective layer and between any two adjacent photo spacers of the plurality of photo spacers formed on the first surface of the protective layer to separate the any two adjacent photo spacers of the plurality of photo spacers formed on the first surface of the protective layer from being in contact with each other, and the at least one hole is filled with a photo spacer material which forms the plurality of photo spacers formed on the first surface of the protective layer rather than a photo spacer of the plurality of photo spacers formed on the first surface of the protective layer; and
an array substrate arranged opposite to the color filter plate.

11. A color filter plate fabrication method, comprising:
providing a substrate;
forming a black matrix layer on the substrate, and patterning the black matrix layer to obtain a black matrix;
forming a color barrier layer on the black matrix and patterning the color barrier layer to obtain a plurality of color barriers;
forming a protective layer directly on the black matrix and the color barrier layer, and forming at least one hole in the protective layer; and
forming a plurality of photo spacers on a first surface of the protective layer, wherein the plurality of photo spacers maintain a constant height level, and the first surface of the protective layer is facing away from the black matrix and the color barrier layer,
wherein the at least one hole is formed in the protective layer and between any two adjacent photo spacers of the plurality of photo spacers formed on the first surface of the protective layer to separate the any two adjacent photo spacers of the plurality of photo spacers formed on the first surface of the protective layer from being in contact with each other, and
the at least one hole is filled with a photo spacer material which forms the plurality of photo spacers formed on the first surface of the protective layer rather than a photo spacer of the plurality of photo spacers formed on the first surface of the protective layer.

12. The color filter plate fabrication method according to claim 11, wherein patterning the color barrier layer to obtain a plurality of color barriers further includes:
patterning the color barrier layer to obtain at least a plurality of red color barriers, a plurality of green color barriers and a plurality of blue color barriers corresponding to a plurality of red color sub-pixels, a plurality of green color sub-pixels and a plurality of blue color sub-pixels, respectively.

13. The color filter plate fabrication method according to claim 11, wherein:
the plurality of color barriers correspond to a plurality of sub-pixels;
the plurality of sub-pixels correspond to the plurality of photo spacers; and
along a direction perpendicular to the color filter plate, projections of the photo spacers fall within the black matrix.

14. The color filter plate fabrication method according to claim 13, wherein:
one sub-pixel corresponds to at least one photo spacer.

15. The color filter plate fabrication method according to claim 11, wherein:
the black matrix further includes a plurality of black matrix stripes confining the color barriers;
the photo spacers are disposed at intersections of the black matrix stripes, forming a photo spacer array; and
the at least one hole is formed in the protective layer and between any two photo spacers adjacent in a row direction of the photo spacer array.

16. The color filter plate fabrication method according to claim 11, wherein:
a depth of the at least one hole is smaller than or equal to a thickness of the protective layer.

17. The color filter plate fabrication method according to claim 11, wherein:
the at least one hole has a rectangular opening, a circular opening or an elliptical opening.

18. The color filter plate fabrication method according to claim 17, wherein:
a width w of the at least one hole is smaller than or equal to a distance between two adjacent photo spacers.

19. The color filter plate fabrication method according to claim 18, wherein:
the width w of the at least one hole is approximately 3 µm≤w≤6 µm.

* * * * *